United States Patent
Jin et al.

(10) Patent No.: US 10,749,880 B2
(45) Date of Patent: Aug. 18, 2020

(54) CLOUD TENANT ORIENTED METHOD AND SYSTEM FOR PROTECTING PRIVACY DATA

(71) Applicant: HUAZHONG UNIVERSITY OF SCIENCE AND TECHNOLOGY, Wuhan, Hubei (CN)

(72) Inventors: Hai Jin, Hubei (CN); Weiqi Dai, Hubei (CN); Yan Xia, Hubei (CN); Deqing Zou, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 181 days.

(21) Appl. No.: 16/109,846

(22) Filed: Aug. 23, 2018

(65) Prior Publication Data

US 2019/0281074 A1  Sep. 12, 2019

(30) Foreign Application Priority Data

Mar. 6, 2018 (CN) .......................... 2018 1 0182419

(51) Int. Cl.
*G06F 21/56* (2013.01)
*H04L 29/06* (2006.01)
*G06F 21/62* (2013.01)

(52) U.S. Cl.
CPC ........ *H04L 63/1416* (2013.01); *G06F 21/566* (2013.01); *G06F 21/6245* (2013.01);
(Continued)

(58) Field of Classification Search
CPC ............. H04L 63/1416; H04L 63/1425; H04L 63/1433; H04L 63/20; G06F 21/566; G06F 21/6245
See application file for complete search history.

(56) References Cited

U.S. PATENT DOCUMENTS

| 9,667,775 | B1 | 5/2017 | Haltom et al. |
| 10,230,750 | B2 * | 3/2019 | Krause .................... H04L 63/20 |

(Continued)

FOREIGN PATENT DOCUMENTS

| CN | 106254317 A | 12/2016 |
| CN | 107070952 A | 8/2017 |
| CN | 107400126 A | 11/2017 |

*Primary Examiner* — Joseph P Hirl
*Assistant Examiner* — Stephen T Gundry
(74) *Attorney, Agent, or Firm* — Michael X. Ye; Morris, Manning & Martin, LLP

(57) ABSTRACT

The present invention involves with a cloud tenant oriented method and system for protecting privacy data. The method comprises at least the following steps: analyzing event handler information and/or behavioral signature information of request information and determining an execution mode, selecting at least one node without a behavioral signature plot to execute the tenant request and recording an execution result, generating a behavioral signature plot based on the execution result, and dynamically detecting security-sensitive behavior based on the behavioral signature plot. The present invention ensures data security during processing of security-sensitive data for cloud services by adopting a technology based on behavioral signatures, and prevents attackers from exploiting vulnerabilities and bypassing security control to conduct malicious operations.

9 Claims, 5 Drawing Sheets

(52) U.S. Cl.
CPC ...... *H04L 63/1425* (2013.01); *H04L 63/1433* (2013.01); *H04L 63/20* (2013.01)

(56) References Cited

U.S. PATENT DOCUMENTS

| | | | |
|---|---|---|---|
| 10,237,286 B2* | 3/2019 | Sharma | H04L 63/1416 |
| 10,320,813 B1* | 6/2019 | Ahmed | H04L 63/1441 |
| 10,498,750 B2* | 12/2019 | Bansal | H04L 67/10 |
| 10,530,787 B2* | 1/2020 | Avrahami | H04L 63/1441 |
| 10,560,487 B2* | 2/2020 | Shulman-Peleg | H04L 63/205 |
| 2013/0333040 A1* | 12/2013 | Diehl | G06F 21/554 |
| | | | 726/24 |
| 2016/0323305 A1 | 11/2016 | Koide et al. | |
| 2016/0359872 A1* | 12/2016 | Yadav | H04L 63/02 |
| 2017/0223029 A1* | 8/2017 | Sharma | H04L 63/1416 |
| 2017/0244748 A1* | 8/2017 | Krause | H04L 63/20 |
| 2017/0289176 A1* | 10/2017 | Chen | H04L 63/1416 |
| 2019/0036978 A1* | 1/2019 | Shulman-Peleg | G06F 21/53 |
| 2019/0068620 A1* | 2/2019 | Avrahami | G06F 21/554 |
| 2019/0068627 A1* | 2/2019 | Thampy | H04W 12/12 |
| 2019/0081961 A1* | 3/2019 | Bansal | H04L 67/10 |
| 2019/0089720 A1* | 3/2019 | Aditham | H04L 9/3239 |
| 2019/0098056 A1* | 3/2019 | Pitre | H04L 63/20 |
| 2019/0121979 A1* | 4/2019 | Chari | G06F 21/566 |
| 2019/0158503 A1* | 5/2019 | Bansal | H04L 63/0823 |
| 2019/0205530 A1* | 7/2019 | Brown | G06F 21/53 |
| 2019/0207969 A1* | 7/2019 | Brown | G06F 16/24568 |
| 2019/0297096 A1* | 9/2019 | Ahmed | H04L 63/1425 |
| 2020/0077265 A1* | 3/2020 | Singh | G06F 21/57 |

* cited by examiner

CLOUD TENANT ORIENTED METHOD AND SYSTEM FOR PROTECTING PRIVACY DATA

FIELD

The present invention relates to security of cloud computation, and more particularly to a cloud tenant oriented method and system for protecting privacy data.

DESCRIPTION OF THE RELATED ART

Being advantageously efficient, energy-saving and stable, cloud computing has become the business and industry trend, especially in the fields of public services, finance, telecommunication and energy. While cloud computing provides people with huge convenience, it brings about security issues that should not be ignored. Once a cloud computing platform is attacked, serious security consequence can happen, such as breaches of user private data. Typically, a cloud computing platform uses cloud-based services to manage user instances. As one of the most popular cloud systems nowadays, the OpenStack platform processes tenant requests through cooperation between cloud-based services, including operating or updating computation instances, managing storage resources, scheduling computing resources and so on. Currently, OpenStack provides not only basic computing services (e.g. Nova), storage services (e.g. Cinder, and Swift) and internet services (e.g. Neutron), but also database services (e.g. Trove), big data services (e.g. Sahara), container orchestration services (e.g. Magnum) and more.

However, OpenStack is still haunted by numerous security concerns. To date there have been more than 150 types of weakness, including denial of service (DoS), abuse of resources and authentication bypass. Attackers may use these vulnerabilities to harvest private data of other users. For example, User A may take advantage of vulnerabilities of image services to manipulate the mirror list of User B by interpolating its virtual machine images containing malicious behaviors, and User B may use the images to create a virtual machine without knowing the fact. User A then, when requesting a new volume from the cloud, may use the vulnerability of the storage services to bypass the deletion of the data in an old volume returned by User B, so as to get that old volume which was used by User B, thereby acquiring the private data of User B. There are many vulnerabilities like this substantively threatening the execution of security policies, and confidentiality and integrity of data. Attackers may even use these vulnerabilities to further control the host computers running the services. Besides, since the services on the OpenStack platform trust each other, when any of its cloud nodes is intruded, attackers can forge requests in the name of that node to attack in various ways. The security threats so raised can endanger the entire cloud environment. Since OpenStack is one of the most extensively deployed cloud-based operating systems, a method that protects tenant data security of OpenStack would greatly contribute to a more secure cloud environment and to more trustable services for tenants.

Presently, there have been only limited methods designed to address the foregoing issues about security of cloud-based services. Although OpenStack protects communication between services and limits user privileges, these measures seem failed in stopping affected nodes from performing malicious behaviors. Also, the approaches currently used to dealing with the foregoing problems are security strategies like mandatory access strategies, privilege control strategies, and isolation, which limit the attack surface. At last, the past researches about data protection in cloud environments were mainly focused on data encryption, data sealing and similar means, and isolation of security-sensitive data where the administrative domain is untrustable, as well as data leakage detection mechanism. While these strategies ensure data confidentiality and integrity, they can only act on security threats related to unauthorized access conducted by any unauthorized party. Since a cloud service has innate access to data in the cloud, attackers are positioned to access private data of other tenants in the cloud surreptitiously, leading to serious data leakage.

To sum up, the existing solutions have the following shortcomings: (1) they mainly work on limiting spread of identified attacks, and are not able to detect malicious behaviors happening at nodes, which means they are ineffective in protecting private data from being exposed to affected nodes before a related vulnerability is found; and (2) while many of these are designed with the premise that the cloud services are all trusted, the fact is that there are so many security-related vulnerabilities existing in individual cloud services, so their lack of data protection in cases of untrustable cloud services can make attacks spread to the entire cloud environment due to mutual trust between these cloud services.

A study titled "Research on Privacy Preserving Mechanism for Tenant Data in Cloud Environment" (Journal of Hubei Institute for Nationalities (Natural Sciences); SHEN Jinan) has disclosed a study framework for a mechanism that protects tenant data privacy, and the mechanism comprises: (1) researches on storage strategies using security-level-based static encryption, which adopt encryption strategies with different levels of intensity depending on different types of data used by tenants, so as to ensure both data confidentiality and high performance of the overall cloud platform; (2) researches on mechanisms for fine-grained access of static data, which through fine-grained encryption algorithms, uses browser-end service technologies to protect user data privacy; (3) researches on security-level-based dynamic data partition storage strategies, which provide partition storage and data encryption with different levels of intensity according to different security levels of tenant data, so as to ensure data confidentiality; and (4) researches on dynamic data security search mechanisms, which provide secure search services without disclosing data information to cloud platforms. This framework contains no behavioral-signature based dynamic behavior detection model for dynamic protection of private data of cloud tenants. While this article gives a general data protection framework for cloud environments based on encryption strategies with different levels of intensity, it fails to cover data security in the context of data processing for cloud services, and fails to prevent attackers from using vulnerabilities to conduct unauthorized, malicious operation.

The present invention is about applications totally different from those considered in that past study. The present invention ensures data security during processing of security-sensitive data for cloud services by adopting a technology based on behavioral signatures, and prevents attackers from exploiting vulnerabilities and bypassing security control to conduct malicious operations. As to protection of private data in cloud environments, the present invention differently integrates applications for more comprehensive data protection as that achieved by the prior-art data protection method.

SUMMARY OF THE INVENTION

In view of the shortcomings of the prior art, the present invention provides a cloud tenant oriented method for protecting privacy data, wherein the method at least comprises: analyzing event handler information and/or behavioral signature information of request information and determining an execution mode, selecting at least one node without a behavioral signature plot to execute the tenant request and recording an execution result, generating a behavioral signature plot based on the execution result, and dynamically detecting security sensitive behavior based on the behavioral signature plot.

According to a preferred mode, the step of analyzing event handler information and/or behavioral signature information of request information and determining an execution mode comprises: decomposing the tenant request into event handler sequence information, retrieving at least one behavioral signature plot corresponding to the event handler sequence information, and determining the execution mode based on the result of retrieving the behavioral signature plot.

According to a preferred mode, the step of selecting at least one node without a behavioral signature plot to execute the tenant request and recording an execution result comprises: determining the number of nodes required to process the event handles and randomly selecting at least one executing node, recording at least one process information and execution result about the executing node processing the event handlers, and selecting the execution results greater than a proportional threshold as the correct execution result and marking the nodes as safe nodes and/or dangerous nodes.

According to a preferred mode, the step of generating a behavioral signature plot based on the execution result comprises: extracting at least one behavioral signature of the executing node processing the event handles, building at least one said behavioral signature into the behavioral signature plot, marking security-sensitive behavior in the behavioral signature plot.

According to a preferred mode, the step of generating a behavioral signature plot based on the execution result further comprises: analyzing the cause of error of the execution result by the dangerous node and fixing the dangerous node according to the analysis result.

According to a preferred mode, the step of dynamically detecting security sensitive behavior based on the behavioral signature plot comprises: selecting the nodes based on a single node selection principle and processing the event handlers, extracting a current operational context when a processing program arrives at a security-sensitive behavior node, comparing the matching result of the current operational context and the operational context of the security sensitive behavior marked in the behavioral signature plot, and where the current operational context does not match the operational context of the corresponding behavioral signature plot, performing early warning analysis, and issuing an instruction for reselecting the node.

According to a preferred mode, the step of dynamically detecting security sensitive behavior based on the behavioral signature plot further comprises: monitoring operation of the processing program based on the behavioral signature plot, and issuing the instruction for extracting the context when the processing program arrives at the security-sensitive behavior node.

According to a preferred mode, signatures in the behavioral signature plot at least comprise triggers, control flows, function calling sequences, contexts and/or operational parameters for processing of the event handlers.

According to a preferred mode, in the behavioral signature plot, each node represents a function, and each side marks the calling relationship among functions.

In the present invention, when there is no corresponding behavioral signature plots, multiples nodes are selected for processing of event handlers, and private data are dynamically protected based on behavioral signature plots, so as to assure secure execution results. For ensuring accuracy of the behavioral signature plots, in the present invention, it is suggested by the present invention to select a plurality of nodes to simultaneously process the first process request, and behavior feature maps are generated according to the processing scheme at the plurality of nodes as reference for processing at subsequent nodes. Where there is a behavioral signature plot, a relatively secure node is selected every time for processing of the event handler, so as to ensure data security based on the behavioral signature plot during processing.

For addressing the problem that attackers can use OpenStack vulnerabilities to bypass and invalid the security protection mechanisms provided by OpenStack, such as access control strategies, and authentication mechanisms and access private data of tenants in the same cloud environment to seriously threat data security, the present invention monitors throughout execution of security-sensitive behaviors such as access control and authentication based on behavioral signature plots, so as to ensure secure completion of security sensitive behaviors, thereby protecting private data of cloud tenants.

The present invention also provides a cloud tenant oriented system for protecting privacy data, wherein the system at least comprises: a request information analyzing module, for analyzing event handler information and/or behavioral signature information of request information and determining an execution mode, a node selecting module, for selecting at least one node without a behavioral signature plot to execute the tenant request and recording an execution result, a behavioral signature plot generating module, for generating a behavioral signature plot based on the execution result, and a dynamic behavior detecting module, for dynamically detecting security-sensitive behavior based on the behavioral signature plot.

According to a preferred mode, the request information analyzing module comprises: an event handler analyzing module, for decomposing the request information into event handler sequence information and performing analysis, a signature analyzing module, for retrieving at least one behavioral signature plot corresponding to the event handler sequence information, and a decision executing module, for determining the execution mode based on a result of retrieving the behavioral signature plot.

According to a preferred mode, the node selecting module comprises: a node statistics module, for determining the number of nodes required to process the event handles and randomly selecting at least one executing node, a recording module, for recording process information about processing of the event handlers by at least one said executing node and executive results, and an executive result analyzing module, for selecting the executive results greater than a proportional threshold as the correct executive result and marking the nodes as safe nodes and/or dangerous nodes.

According to a preferred mode, the behavioral signature plot generating module comprises: signature extracting module, for extracting at least one behavioral signature of at least one executing node processing the event handlers, a behavioral signature plot building module, for building at least one behavioral signature into the behavioral signature plot, marking module, for marking security sensitive behavior in the behavioral signature plot.

According to a preferred mode, the behavioral signature plot generating module further comprises: analyzing and fixing module, for analyzing the cause of error of the execution result by the dangerous node and fixing the dangerous node according to the analysis result.

According to a preferred mode, the dynamic behavior detecting module comprises: a single-node selecting module, for selecting the nodes based on a single-node selection principle and processing the event handlers, an execution context extracting module, for extracting a current operational context when a processing program arrives at a security-sensitive behavior node, a behavior early warning matching module, for comparing the matching result of the current operational context and the operational context of the security sensitive behavior marked in the behavioral signature plot to see whether they match each other, and an alarm analyzing module, for where the current operational context does not match the operational context of the corresponding behavioral signature plot, performing early warning analysis, and issuing an instruction for reselecting the node.

According to a preferred mode, the dynamic behavior detecting module further comprises: monitoring module, for monitoring operation of the processing program based on the behavioral signature plot, and issuing the instruction for extracting the context when the processing program arrives at the security-sensitive behavior node.

According to a preferred mode, signatures in the behavioral signature plot at least comprise triggers, control flows, function calling sequences, contexts and/or operational parameters for processing of the event handlers.

According to a preferred mode, in the behavioral signature plot, each node represents a function, and each side marks the calling relationship among functions.

According to a preferred mode, the security sensitive behavior at least comprises calling a security sensitive function and/or behavior leading to a wrong execution result at the node.

The present invention also provides a cloud tenant oriented system for protecting privacy data, wherein the system at least comprises: a client, for issuing request information, a request information analyzing module, for analyzing event handler information and/or behavioral signature information of request information and determining an execution mode, a node selecting module, for selecting at least one node without a behavioral signature plot to execute the tenant request and recording an execution result, a behavioral signature plot generating module, for generating a behavioral signature plot based on the execution result, and a dynamic behavior detecting module, for dynamically detecting security-sensitive behavior based on the behavioral signature plot, wherein, for the event handler having a corresponding behavioral signature plot, the dynamic behavior detecting module, based on the behavioral signature plot, compares the execution context that has more marks of security sensitive behaviors with the corresponding current execution context to see whether they match each other to dynamically detect security sensitive behaviors.

The present invention has the following beneficial technical effects:

(1) Fine-grained security protection: the present invention analyzing and locating security sensitive behaviors happening in the course that a cloud service processes a tenant request by generating behavioral signature plots, so as to provide fine-grained protection in a behavior-specific way;

(2) Real time: the present invention can perform real-time detection of malicious behaviors that diverge from the behavioral signature plot while processing a tenant request, and selecting a different node to process the request once any abnormality is noted, without causing long downtime of the cloud service at issue; and (3) Low costs: the present invention uses offline analysis to generate behavioral signature plots and locate security-sensitive behaviors, and provides targeted protection for security sensitive behaviors during execution, so as to prevent degraded performance due to unnecessary security mechanisms.

DETAILED DESCRIPTIONS OF THE INVENTION

Figure 1:
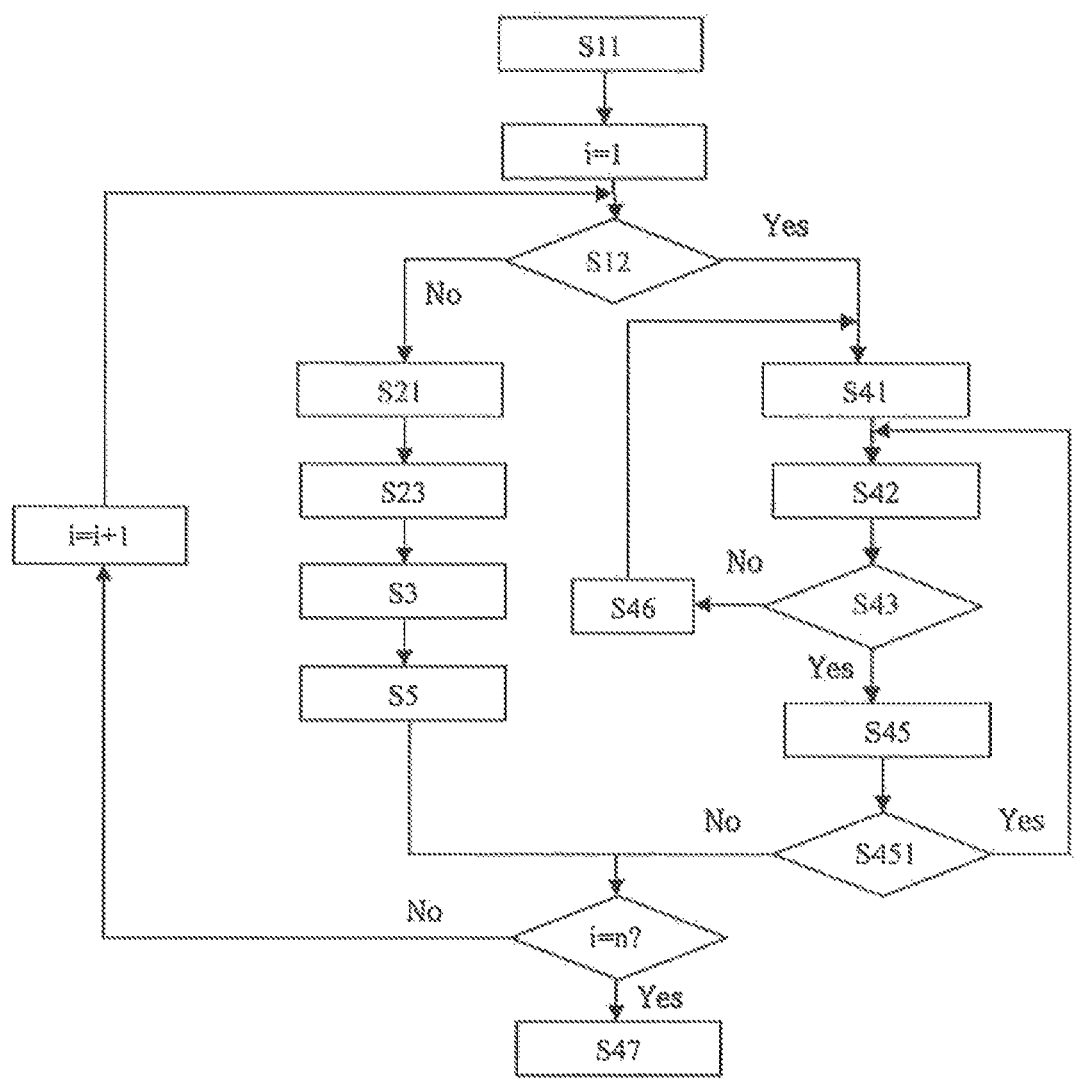
FIG. 1 is an overall flowchart of a method of the present invention.

The following description, in conjunction with the accompanying drawings and preferred embodiments, is set forth as below to illustrate the present invention.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

Embodiment 1

To meet the needs for improving the shortcomings of the prior art, the present invention, based on the assumption that a cloud service node is untrustable, when a cloud service processes a tenant request, generates behavioral signature plots according to mass records of nodes processing requests, and then uses the behavioral signature plots to determine whether the context of security sensitive behavior is right, so as to ensure that every request raised by the tenant is completed in a secure and trustable way. This prevents attackers from using OpenStack vulnerabilities to get unauthorized access to private data of cloud tenants during execution of a tenant request.

The disclosed cloud tenant oriented method for protecting privacy data is characterized in that the method at least comprises the following steps.

Step S1 involves analyzing event handler information and/or behavioral signature information of request information and determining an execution mode.

For example, a tenant sends out request information through a client 10. The tenant request information is decomposed into a set of event handlers $\{e_1, e_2, e_3 \ldots, e_n\}$. Each cloud server processes an event handler $e_i$ ($1 \le i \le n$). For the cloud server to process the event handler $e_i$, it searches for a behavioral signature plot corresponding to the event handler $e_i$ in its behavioral signature plot library 60, and selects a corresponding execution mode according to the search result. The execution mode comprises a node-selecting execution mode without a behavioral signature plot and a dynamic detection and execution mode with behavioral signature plots.

Step S2 involves selecting at least one node without a behavioral signature plot map to execute the tenant request and recording an execution result.

For the request information for which there is no behavioral signature plot retrieved, plural nodes are selected to execute the request information at the same time. The execution result seen at the most nodes is taken as the final result, so as to ensure the security of this operation. Meanwhile, the information about execution of the request is recorded for generating a behavioral signature plot.

Step S3 involves generating a behavioral signature plot based on the execution result.

A behavioral signature plot is a signature set for expressing event handlers. It can accurately locate security sensitive behaviors and record operational contexts of security sensitive behaviors.

Step S4 involves dynamically detecting security-sensitive behavior based on the behavioral signature plot.

Herein, the behavioral signature plots comprise behavioral signature plots retrieved through search and behavioral signature plots that are generated. Dynamic detection is made to execution of the request information of the user according to the behavioral signature plot to check the security-sensitive behaviors therein and to ensure the related security-sensitive operations can be executed securely. The security-sensitive behaviors are monitored, and only when the current operational context conforms to the behavioral signature plot, the execution can proceed.

Preferably, as shown in FIG. 1, the step of analyzing event handler information and/or behavioral signature information of the tenant request and determining the execution mode comprises the following steps.

S11 involves decomposing the tenant request into event handler sequence information.

For example, service type information is analyzed. The request information contains event handler information and behavioral signature information. The request information of each tenant is decomposed into a set of event handlers. A cloud server is selected to process an event handler sequentially.

Step S12 involves retrieving at least one behavioral signature plot corresponding to the event handler sequence information.

For example, for each event handler, the corresponding behavioral signature plot is searched in a behavioral signature plot library 60 of a relevant cloud server.

Step S13 involves determining the execution mode based on the retrieving result of the behavioral signature plot.

For example, where a behavioral signature plot corresponding to the event handler is found, dynamic behavioral check is performed based on the behavioral signature plot. In the event that no behavioral signature plot corresponding to the event handler is found, at least one corresponding node without behavioral signature is selected for processing of the event handler and running of the program.

In other words, if there is a behavioral signature plot, the dynamic detection and execution mode is activated, and if there is not a behavioral signature plot, the node selection and execution mode is activated.

Figure 2:
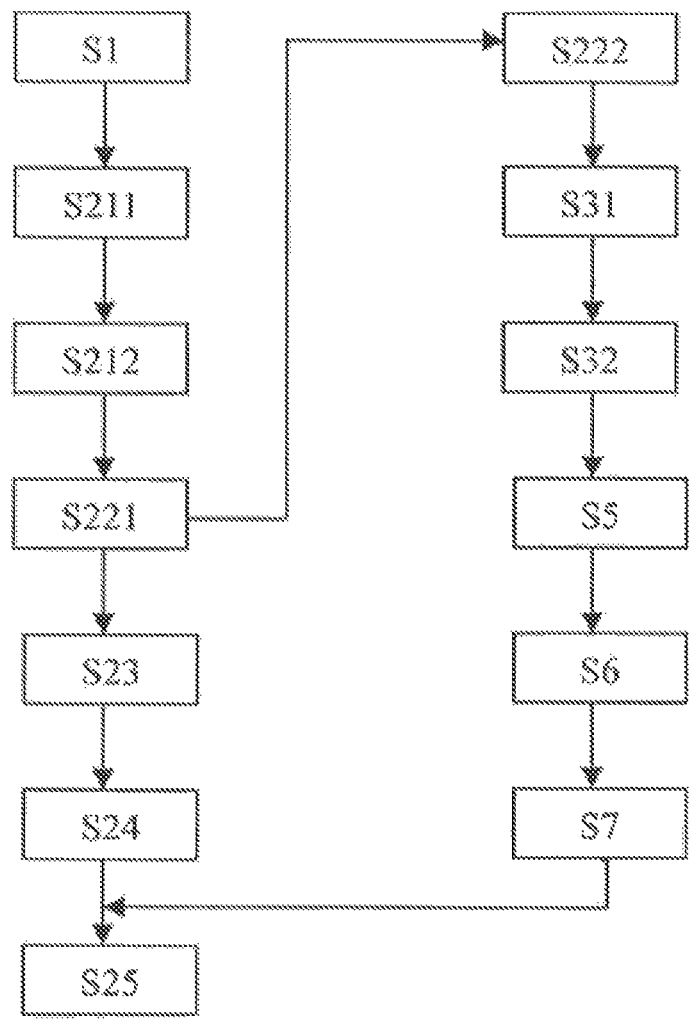
FIG. 2 is a flowchart of processing of an event handler without generating a behavioral signature plot.

Preferably, as shown in FIG. 2, the step of selecting at least one node without a behavioral signature plot to execute the tenant request and recording an execution result comprises the following steps.

The process starts at Step S20.

Step S21 involves determining the number of nodes required to process the event handlers and randomly selecting at least one executing node.

Step S211 involves calculating the number of the nodes having to execute the event handler. According to the total number of the nodes in the cloud server and the number of dangerous nodes, the number of nodes required by processing the event handler is calculated and determined as N. The selected nodes should be quantitatively enough so as to ensure that eventually the correct execution results are more than the wrong ones. However, since recording execution at the nodes in detail requires huge costs, it is important to ensure correct results using as fewer nodes as possible. With this concern, selecting more nodes is unnecessarily the better choice.

Step S212 involves randomly selecting N nodes from the nodes of the cloud server for proceeding of the event handler.

Step S22 involves recording the process information and execution result of at least one executing node processing the event handler.

Step S221 involves recording the execution result of at least one executing node processing the event handler.

Step S222 involves recording the process information of at least one executing node processing the event handler, namely the executive flow.

At the same time of processing the event handler, the status variations and execution results of each node processing the event handler are collected and recorded in detail, including the function calling sequence and its parameters.

Step S23 involves selecting the execution results greater than a proportional threshold as the correct execution result and marking the nodes as safe nodes and/or dangerous nodes.

In an example following the majority rule, the threshold is 50%. Selecting the executive result seen at the most nodes as the correct executive result means selecting the executive result seen at more than 50% of the total nodes as the correct executive result. The service nodes having wrong executive results are marked as dangerous nodes. The service nodes having the correct executive result are marked as safe nodes. Preferably, only dangerous nodes or only safe nodes are marked. Alternatively, dangerous nodes and safe nodes are marked separately.

Preferably, the proportional threshold is not limited to 50%, and may be changed according to practical needs.

Step S24 involves selecting an execution result of a node from the nodes having the correct result as the final result.

The process ends at Step S25.

Preferably, as shown in FIG. 2, the step of generating the behavioral signature plot based on the execution result comprises the following steps.

Step S31 involves extracting the behavioral signature of at least one executing node processing the event handler.

According to the executive flow along which the safe nodes process the event handler as reflected in the acquired operational record of the nodes, the behavioral signatures of the safe nodes are extracted and analyzed so as to generate the behavioral signature plot.

By extracting the behavioral signatures of the safe nodes and of the dangerous nodes, the behavioral signature plot can describe the security-sensitive behaviors during processing of the event handler more precisely and more efficiently. At last, the event handler $e_i$ and its behavioral signature plot are recorded in the behavioral signature plot library 60 of each cloud server.

Preferably, the behavioral signature at least comprise triggers, control flows, function calling sequences, contexts and/or operational parameters for processing of the event handlers.

Step S32 involves composing at least one behavioral signature into the behavioral signature plot.

This step is implemented by connecting at least one behavioral signature so as to form a behavioral signature plot. A behavioral signature plot refers to a diagram generated by integrating and analyzing a function-calling diagram, a control flow diagram, and operational parameters during processing of an event handler. Where there is only one behavioral signature, the behavioral signature plot is the same thing as the behavioral signature. Where there are two or more behavioral signatures, the functions in the behavioral signatures are marked as nodes, and the calling relationship is expressed as sides, so as to create a behavioral signature plot. Preferably, a behavioral signature plot may be generated online or offline.

Preferably, in the behavioral signature plot, each said node represents a function, and each side marks the calling relationship among functions.

Preferably, the step of generating the behavioral signature plot based on execution result further comprises the following step.

Step S5 involves marking the security-sensitive behaviors in the behavioral signature plot.

The security-sensitive behaviors happening during processing of the event handlers at the nodes, or the security-sensitive behaviors shown in the behavioral signature plots are marked. Preferably, the security-sensitive behaviors at least comprise calling a security-sensitive function and/or behavior leading to a wrong executive result at the node.

Preferably, the step of generating a behavioral signature plot based on the executive result further comprises: in Step S6, analyzing why the dangerous node has the wrong executive result and fixing the dangerous node by referring to a result of the analysis.

Particularly, Step S61 involves after the behavioral signature plot is created, analyzing why the execution result of the dangerous node is wrong. The reason may be that the parameters were altered during execution or that security check was bypassed.

Step S62 involves fixing the dangerous nodes by referring to the reasons of errors as found through analysis, so as to turn the dangerous nodes into safe nodes, thereby improving security at the cloud server.

Step S7 involves storing the behavioral signature plots in a behavioral signature library of the corresponding cloud server.

Figure 3:
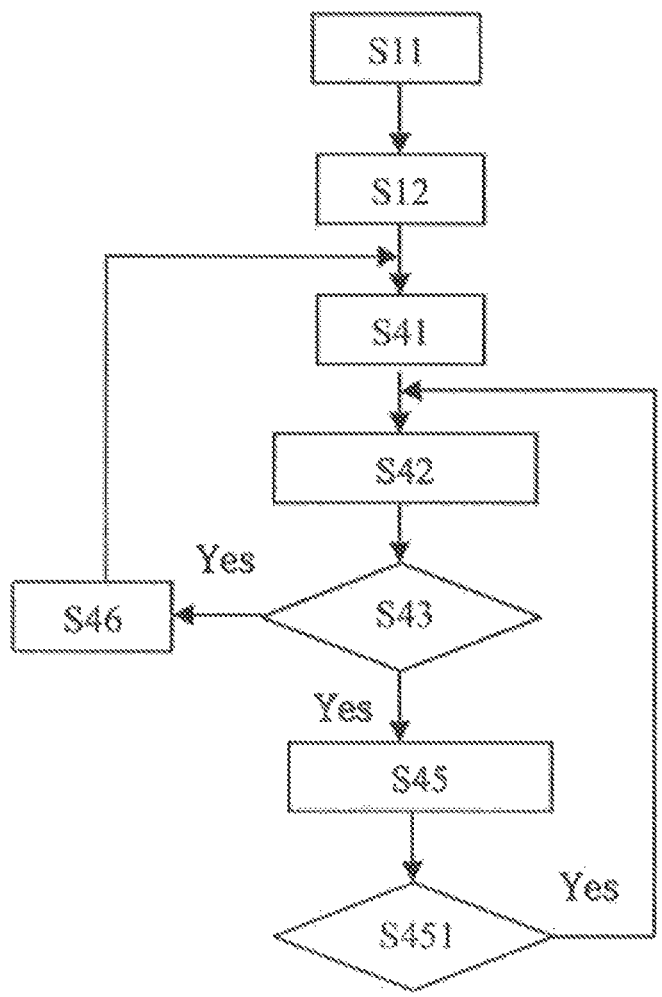
FIG. 3 is a flowchart of processing of an event handler when a behavioral signature plot has been generated.

Preferably, as shown in FIG. 3, the step of dynamically detecting the security-sensitive behavior based on the behavioral signature plot comprises: looking for a behavioral signature plot having the event handler $e_i$ (1≤i≤n) in the behavioral signature plot library 60. Performing fine-grained monitoring to security-sensitive behaviors during execution based on the behavioral signature plots can ensure the operational context of the security-sensitive behavior conforms to the behavioral signature plot, thereby protecting data security while maintaining relatively low performance costs.

Step S4 is performed through the following steps.

Step S41 involves selecting the nodes based on a single-node selection principle and processing the event handlers.

The single-node selection principle refers to that the requests submitted by the same user are executed at the same node as far as possible.

Step S42 involves extracting a current operational context when a processing program arrives at a node performing security-sensitive behavior.

According to the retrieved behavioral signature plot, when security-sensitive behavior happens during running of the program, the program is suspended from running, and the context of the current program execution is extracted.

Step S43 involves comparing the current operational context and the operational context of the security-sensitive behavior marked in the behavioral signature plot to see whether they match each other.

Step S44 involves where the current operational context does not match the operational context of the corresponding behavioral signature plot, performing early warning analysis, and issuing an instruction for selecting a different node.

Particularly, the current execution context and the context of the security-sensitive behaviors in the behavioral signature plot are compared to each other.

Step S45 involves where the two match each other, allowing the security-sensitive behavior to be performed and proceeding to running the program.

Step S451 involves proceeding to detecting whether the program arrives at a mark of security-sensitive behavior, and if the program arrives at a mark of security-sensitive behavior, proceeding to extracting the current operational context, or if the program does not arrive at a mark of security-sensitive behavior, ending when i=n, or proceeding to extracting the signatures of the next event handler when I≠n.

Step S46 involves where the two do not match, giving out an alarm and suspending the program from running.

It is to be noted that, the steps in the method of the present invention are not necessarily performed in the order described herein. As long as the objective of the present invention can be achieved, some of these step may be conducted in a different order, and this shall also be included in the scope of the present invention.

The process ends at Step S47.

When an alarm is given, the reason why the operational context of the security-sensitive behavior does not match is analyzed, so as to determine whether there is any malicious behavior.

Preferably, the step of dynamically detecting the security-sensitive behavior based on the behavioral signature plot further comprises: monitoring running of the processing program based on the behavioral signature plot, and issuing the instruction for extracting the context when the processing program arrives at the node performing the security-sensitive behavior.

Particularly, monitoring appearances of security-sensitive behaviors is helpful to accurately determine when to extract the execution context, so as not to overlook appearance of any security-sensitive behavior.

The disclosed method is explained in a practical scenario.

In an example, a vulnerability CVE-2015-7546 has been found in an OpenStack authentication module KeyStone. During use of a token provided by PKI or PKIZ, the vulnerability prevents proper authentication of the token, and an attacker can use the vulnerability to bypass security mechanisms such as access control, or can use an expired token to perform unauthorized operation. According to the disclosed method, for the first-time authentication of the token, plural nodes are selected to perform the operation. Where the results of authentication among these nodes are inconsistent, the majority rules, and the minority having abnormal results is analyzed. The foregoing process is effective in finding new vulnerabilities to some extent. Additionally, behavioral signature plots of behaviors for token authentication are generated according to the operational flow along which most of the nodes process token authentication. Afterward, one node is selected to perform the token authentication request, and integrity of token authentication is ensured based on the behavioral signature plots, meaning that the control flow of token authentication is not tampered by any attacker, so as to protect private data of cloud tenants.

The security-sensitive behaviors are obtained by referring to the functions of the OpenStack module and analyzing the currently identified vulnerabilities. For example, the OpenStack authentication module KeyStone is designed to provide authentication services, token services, strategy services and directory services. According to the functions of the services and the vulnerabilities identified by the CVE, the security-sensitive behavior related to authentication services is operations associated with password management. The security-sensitive behaviors related to token services include assignment and authentication of tokens. The security-sensitive behaviors related to strategy services are behaviors for executing security strategies of each of the modules. The directory services only involve providing the directory of services accessible to tenants, and thus are not related to any security-sensitive behavior. The dynamic detection and execution mode effectively ensures secure execution of security-sensitive behaviors. First, security-sensitive behaviors in each service are located. When it is detected that the program is performing a security-sensitive behavior, the executive flow of the program is compared to the behavioral signature plot, and any operation that does not conform to the behavioral signature plot is prevented, so as to ensure integrity of the information flow of the program.

Embodiment 2

The present embodiment is further improvement based on Embodiment 1, and the repeated description is omitted herein.

Figure 4:
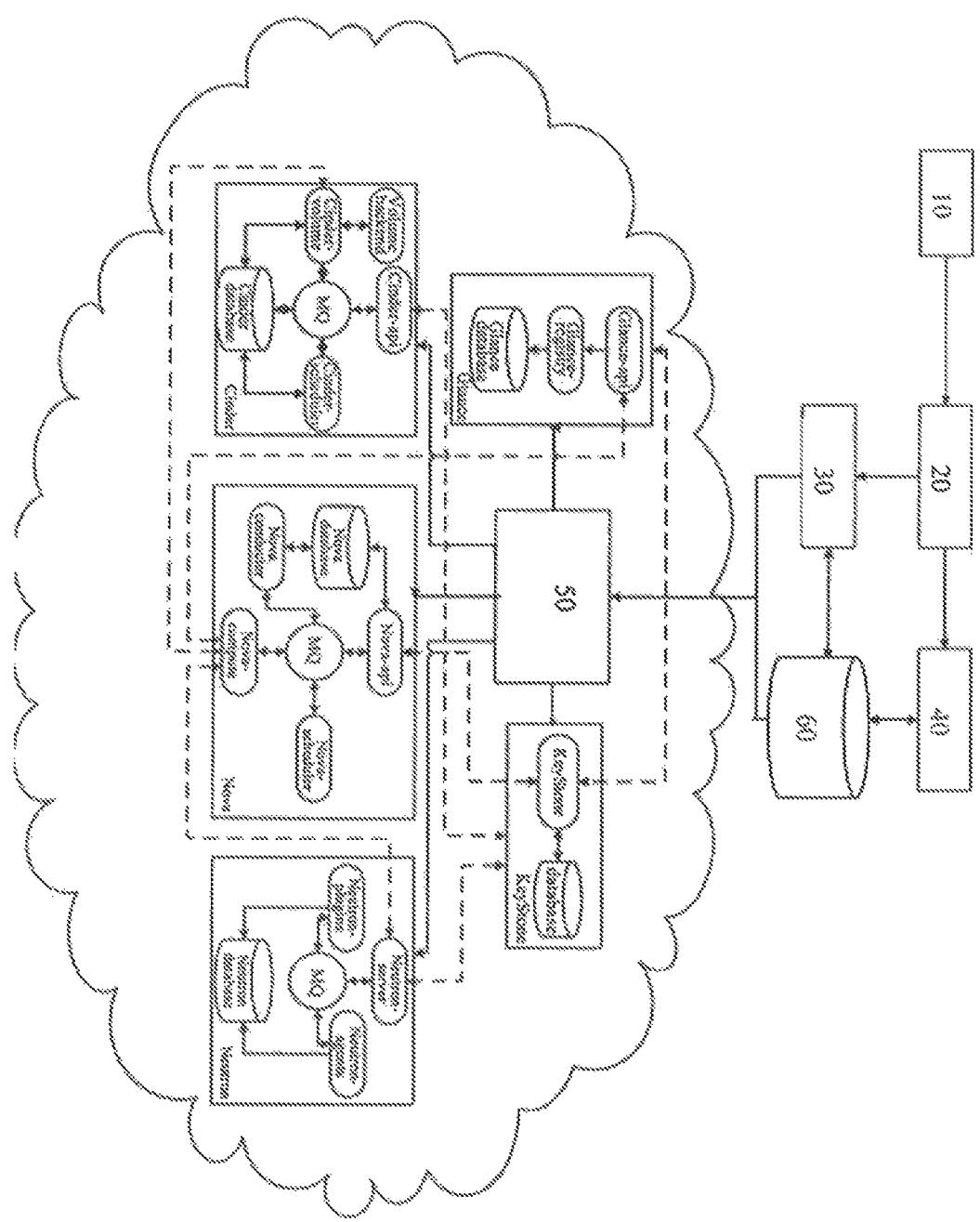
FIG. 4 is a logic diagram of a system of the present invention.

As shown in FIG. 4, the present embodiment discloses a cloud tenan oriented system for protecting privacy data.

The disclosed cloud tenant oriented system for protecting privacy data at least comprises: a request information analyzing module 20, for analyzing event handler information and/or behavioral signature information of request information and determining the execution mode, a node selecting module 30, for selecting at least one node without a behavioral signature plot to execute the tenant request and recording an execution result, a behavioral signature plot generating module 40, for based on execution result generating behavioral signature plot, and a dynamic behavior detecting module 50, for dynamically detecting security-sensitive behavior based on the behavioral signature plot.

Preferably, for event handlers having behavioral signature plots, the dynamic behavior detecting module 50, based on the behavioral signature plot, compares the execution context that has more marks of security-sensitive behaviors with the corresponding current execution context to see whether they match each other to dynamically detect security-sensitive behaviors.

Preferably, the request information analyzing module 20 comprises one or more of an ASIC (application specific integrated circuit) chip, a processor, a server and a server set. The ASIC chip, processor, server and server set are each configured to analyze the event handler information and/or behavioral signature information of request information sent by the client, and to determine the execution mode.

The node selecting module 30 comprises one or more of an ASIC chip, a processor, a server and a server set. The ASIC chip, processor, server and server set are each configured to select the node for conducting the task of request information and record executive results.

The behavioral signature plot generating module 40 comprises one or more of an ASIC chip, a processor, a server and a server set. The ASIC chip, processor, server and server set are each configured to summarize signatures identified during processing of request information into behavioral signature plots.

The dynamic behavior detecting module 50 comprises one or more of an ASIC chip, a processor, a server and a server set. The ASIC chip, processor, server and server set are each configured to dynamically detect security-sensitive behaviors based on behavioral signature plots.

Figure 5:
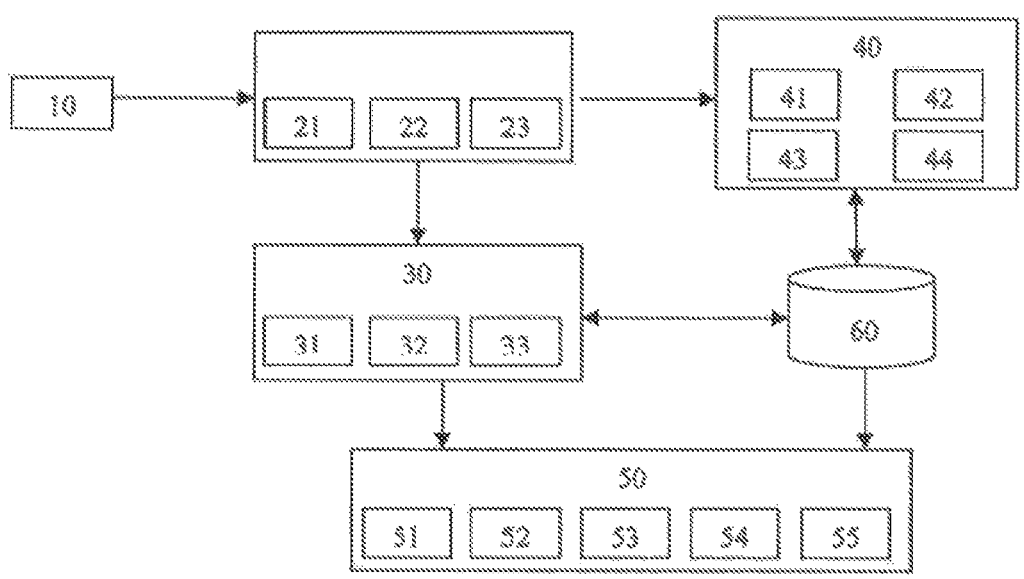
FIG. 5 is another logic diagram of the system of the present invention.

According to a preferred mode, as shown in FIG. 5, the request information analyzing module is not limited to a separate component, and may be a combination of multiple components.

For example, the request information analyzing module 20 comprises: an event handler analyzing module 21, a signature analyzing module 22, and a decision executing module 23. The event handler analyzing module 21 decomposes the request information into event handler sequence information and performs analysis. The signature analyzing module 22 retrieves at least one behavioral signature plot corresponding to the event handler sequence information. The decision executing module 23 determines the execution mode based on a result of retrieving the behavioral signature plot.

Preferably, the event handler analyzing module comprises one or more of a CPU, a microprocessor, a single-chip microcomputer, a server, and an ASIC chip. Preferably, the event handler analyzing module is an ASIC chip configured to decompose the request information into event handler sequence information and perform analysis.

The signature analyzing module comprises one or more of a CPU, a microprocessor, a single-chip microcomputer, a server, and an ASIC chip. Preferably, the signature analyzing module is an ASIC chip configured to retrieve at least one behavioral signature plot corresponding to the event handler sequence information.

The decision executing module comprises one or more of a CPU, a microprocessor, a single-chip microcomputer, a server, and an ASIC chip. Preferably, the decision executing module is an ASIC chip configured to determine the execution mode based on a result of retrieving the behavioral signature plot.

The advantage of realizing the event handler analyzing module 21, the signature analyzing module 22, and the decision executing module 23 using ASIC chips is that the information analyzing module can be minimized in terms of volume and weight without compromising its functions and performance.

According to a preferred mode, node selecting module 30 is not limited to a separate component, and may be a combination of multiple components.

As shown in FIG. 5, the node selecting module 30 comprises: a node statistics module 31, a recording module 32, and an executive result analyzing module 33.

The node statistics module 31 determines a number of nodes where event handlers have to be processed and randomly selecting at least one executing node. The recording module 32 records process information about processing of the event handlers by at least one said executing node and executive results. The executive result analyzing module 33 selects greater than proportional threshold the executive results greater than a proportional threshold as the correct executive result and marks the nodes as safe nodes and/or dangerous nodes.

Preferably, the node statistics module 31 comprise one or more of a CPU, a microprocessor, a single-chip microcomputer, a server, and an ASIC chip for determining a number of nodes where event handlers have to be processed and randomly selecting at least one executing node.

The recording module 32 comprises one or more of a memory, a disc, and a storage chip for recording process information about processing of the event handlers by at least one said executing node and executive results.

The executive result analyzing module 33 is one or more of a CPU, a microprocessor, a single-chip microcomputer, a server, and an ASIC chip that can select the executive result greater than the proportional threshold as the correct executive result and mark the nodes as safe nodes and/or dangerous nodes.

Preferably, the node statistics module 31, the recording module 32, and the executive result analyzing module 33 are respectively an ASIC chip having corresponding functions. This arrangement facilitates minimizing the node selecting module in both size and mass while maximizing it in performance.

According to a preferred mode, the behavioral signature plot generating module 40 is not limited to a separate component, and may be a combination of multiple components.

The behavioral signature plot generating module 40 comprises: a signature extracting module 41, a behavioral signature plot building module 42, and a marking module 43. The signature extracting module 41 extracts signatures of processing of event handlers at one or more executing nodes. The behavioral signature plot building module 42 uses at least one behavioral signature to create a behavioral signature plot. The marking module 43 marks security-sensitive behaviors in the behavioral signature plots.

The signature extracting module 41 comprises one or more of a CPU, a microprocessor, a single-chip microcomputer, a server, and an ASIC chip that can extract signatures of processing of event handlers at one or more executing nodes. The behavioral signature plot building module 42 comprise one or more of a CPU, a microprocessor, a single-chip microcomputer, a server, and an ASIC chip that can create behavioral signature plots. The marking module 43 comprise one or more of a CPU, a microprocessor, a single-chip microcomputer, a server, and an ASIC chip that can mark security-sensitive behaviors in a behavioral signature plot.

Preferably, the behavioral signature plot generating module 40 further comprises: an analyzing and fixing module 44, for analyzing why the dangerous node has the wrong executive result and fixing the dangerous node by referring to a result of the analysis.

Preferably, the analyzing and fixing module 44 comprise one or more of a CPU, a microprocessor, a single-chip microcomputer, a server, and an ASIC chip. Preferably, the analyzing and fixing module is an ASIC chip. The ASIC chip is configured to analyze the reason why the dangerous node did wrongly to the executive result and fix the dangerous node by referring to the result of the analysis.

Preferably, the dynamic behavior detecting module 50 comprises: a single-node selecting module 51, an execution context extracting module 52, a behavior proactive matching module 53 and an alarm analyzing module 54. The single-node selecting module S1 selects the nodes based on a single-node principle and processes the event handlers. The execution context extracting module 52 extracts a current operational context when a processing program arrives at a said node performing a said security-sensitive behavior. The behavior proactive matching module 53 compares the current operational context and the operational context of the security-sensitive behavior marked in the behavioral signature plot to see whether they match each other. The alarm analyzing module 54 where the current operational context does not match the operational context of the corresponding behavioral signature plot, performs proactive analysis, and issues an instruction for selecting a different said node.

Preferably, the single-node selecting module 51 comprises one or more of a CPU, a microprocessor, a single-chip microcomputer, a server, and an ASIC chip. Preferably, the single-node selecting module is a microprocessor. The microprocessor is configured to selecting the nodes based on a single-node principle and processing the event handlers.

The execution context extracting module 52 comprises one or more of a CPU, a microprocessor, a single-chip microcomputer, a server, and an ASIC chip. Preferably, the execution context extracting module is an ASIC chip. The ASIC chip is configured to extract the current operational context when a security-sensitive behavior happens.

The behavior proactive matching module 53 comprises one or more of a CPU, a microprocessor, a single-chip microcomputer, a server, and an ASIC chip. Preferably, the behavior proactive matching module is ASIC chip. The ASIC chip is configured to compare the operational context of the security-sensitive behavior marked in the behavioral signature plot to the current operational context to see whether they match each other.

The alarm analyzing module 54 comprise one or more of a CPU, a microprocessor, a single-chip microcomputer, a server, and an ASIC chip. Preferably, the alarm analyzing module is a microprocessor. The microprocessor is configured to analyze failed matching and issue an proactive instruction. Preferably, the alarm analyzing module is connected to an proactive device. The proactive device may be a player, a vibrator, a flasher or the like.

Preferably, the dynamic behavior detecting module 50 further comprises: a monitoring module 55, for, based on the behavioral signature plot, monitoring how processing is performed, and issuing the instruction for extracting the context when the processing program arrives at the node performing the security-sensitive behavior.

The monitoring module 55 comprises one or more of a CPU, a microprocessor, a single-chip microcomputer, a server, and an ASIC chip. Preferably, the monitoring module is an ASIC chip.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A cloud tenant oriented method for protecting privacy data, the method at least comprising:
    (a) analyzing event handler information and/or analyzing behavioral signature information of request information and determining an execution mode,
    (b) selecting at least one node without a behavioral signature plot to execute the tenant request and recording an execution result,
    (c) generating a behavioral signature plot based on the execution result, and
    (d) dynamically detecting security-sensitive behavior based on the behavioral signature plot,
    wherein the behavioral signature plot refers to a diagram generated by integrating and analyzing a function-calling diagram, a control flow diagram, and operational parameters during processing of an event handler, and
    wherein the behavioral signature plot in step (c) is generated by:
        (c1) extracting at least one behavioral signature of the executing node processing the event handles,
        (c2) building at least one said behavioral signature into the behavioral signature plot,
        (c3) marking security-sensitive behavior in the behavioral signature plot, and
        (c4) analyzing the cause of error of the execution result by the dangerous node and fixing the dangerous node according to the analysis result.

2. The privacy data protection method of claim 1, wherein the steps of analyzing event handler information, and/or behavioral signature information of request information and determining an execution mode comprises:
    decomposing the tenant request into event handler sequence information,
    retrieving at least one behavioral signature plot corresponding to the event handler sequence information, and
    determining the execution mode based on the result of retrieving the behavioral signature plot.

3. The privacy data protection method of claim 1, wherein the steps of selecting at least one node without a behavioral signature plot to execute the tenant request and recording an execution result comprises:
    determining the number of nodes required to process the event handlers and randomly selecting at least one executing node,
    recording at least one process information and execution result about said executing node processing the event handlers, and
    selecting the execution results greater than a proportional threshold as the correct execution result and marking the nodes as safe nodes and/or dangerous nodes.

4. The privacy data protection method of claim 1, wherein the step of dynamically detecting security sensitive behavior based on the behavioral signature plot comprises:
    selecting the nodes based on a single node selection principle and processing the event handlers,
    extracting a current operational context when a processing program arrives at a security-sensitive behavior node,
    comparing the matching result of the current operational context and the operational context of the security sensitive behavior marked in the behavioral signature plot,
    where the current operational context does not match the operational context of the corresponding behavioral signature plot, performing early warning analysis, and issuing an instruction for reselecting the node.

5. The privacy data protection method of claim 4, wherein the step of dynamically detecting security-sensitive behavior based on the behavioral signature plot further comprises:
    monitoring operation of the processing program based on the behavioral signature plot, and issuing the instruction for extracting the context when the processing program arrives at the security-sensitive behavior node.

6. A cloud tenant oriented system for protecting privacy data, the system at least comprising:
    (a) a request information analyzing module, for analyzing event handle information and/or analyzing behavioral signature information of request information; and determining an execution mode,
    (b) a node selecting module, for selecting at least one node without a behavioral signature plot to execute the tenant request; and recording an execution result, (c) a behavioral signature plot generating module, for generating a behavioral signature plot based on the execution result, and (d) a dynamic behavior detecting module, for dynamically detecting security sensitive behavior based on the behavioral signature plot;

wherein the behavioral signature plot refers to a diagram generated by integrating and analyzing a function-calling diagram, a control flow diagram, and operational parameters during processing of an event handler, and wherein the behavioral signature plot generating module in (c) generates the behavioral signature plot based on the execution result by:

(c1) extracting at least one behavioral signature of the executing node processing the event handler, (c2) building at least one said behavioral signature into the behavioral signature plot, (c3) marking security-sensitive behavior in the behavioral signature plot, and (c4) analyzing the cause of error of the execution result by the dangerous node and fixing the dangerous node according to the analysis result.

7. The system for protecting privacy data of claim 6, wherein the request information analyzing module comprises:

(a1) an event handler analyzing module, for decomposing the request information into event handle sequence information; and performing analysis, (a2) a signature analyzing module, for retrieving at least one behavioral signature plot corresponding to the event handler sequence information, and (a3) a decision executing module, for determining the execution mode based on a result of retrieving the behavioral signature plot.

8. The system for protecting privacy data of claim 6, wherein the node selecting module comprises:

(b1) a node statistics module, for determining the number of nodes required to process the event handlers and randomly selecting at least one executing node, (b2) a recording module, for recording process information about processing of the event handlers by at least one said executing node and executive results, and (b3) an executive result analyzing module, for selecting the executive results greater than a proportional threshold as the correct executive result; and marking the nodes as safe nodes and/or dangerous nodes.

9. The system for protecting privacy data of claim 7, wherein the node selecting module comprises:

(b1) a node statistics module, for determining the number of nodes required to process the event handlers and randomly selecting at least one executing node, (b2) a recording module, for recording process information about processing of the event handlers by at least one said executing node and executive results, and (b3) an executive result analyzing module, for selecting the executive results greater than a proportional threshold as the correct executive result; and marking the nodes as safe nodes and/or dangerous nodes.

* * * * *